UNITED STATES PATENT OFFICE.

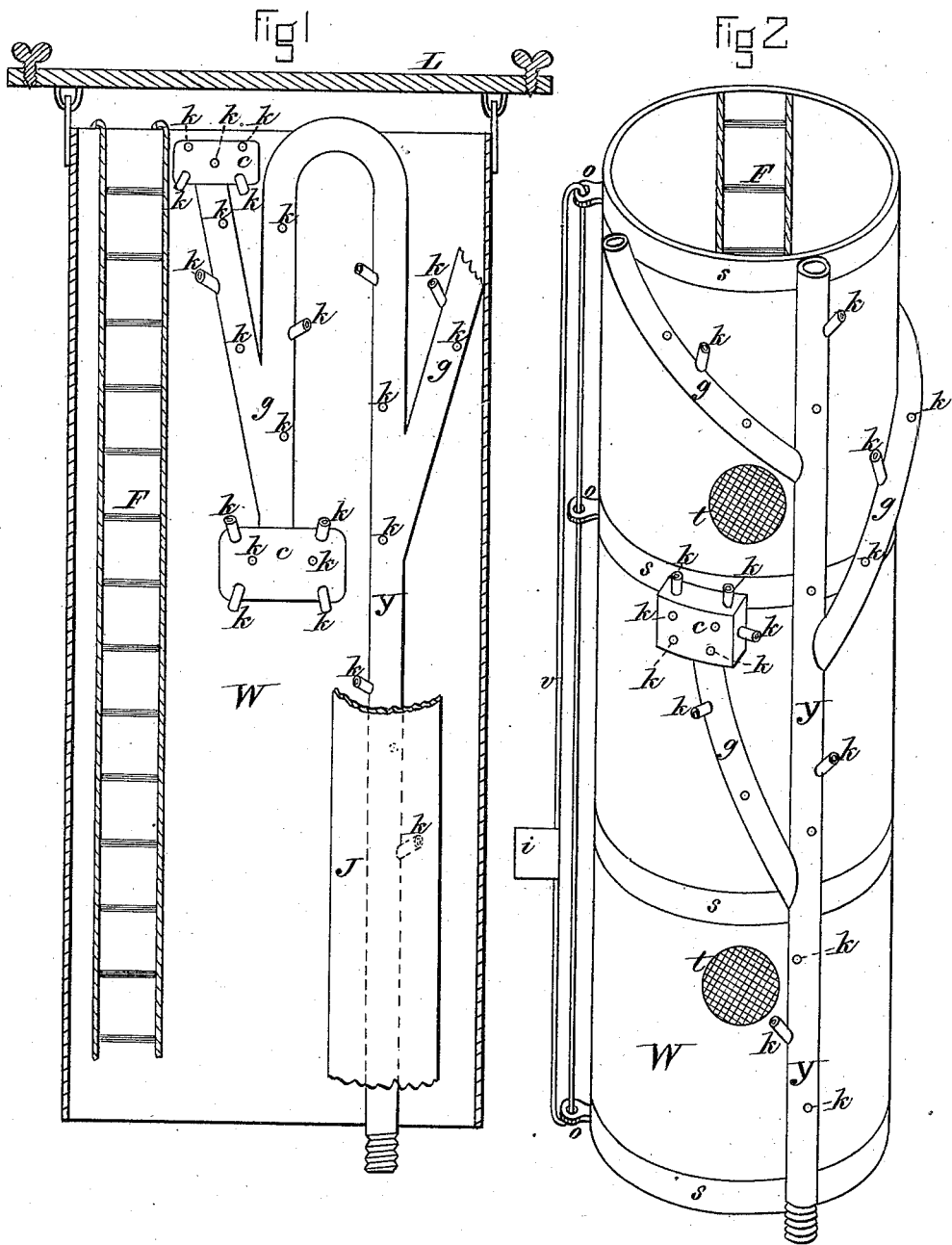

GEORGE W. PUTNAM, OF MALDEN, MASSACHUSETTS.

FIRE-ESCAPE.

SPECIFICATION forming part of Letters Patent No. 313,024, dated February 24, 1885.

Application filed July 3, 1884. (No model.)

*To all whom it may concern:*

Be it known that I, GEORGE W. PUTNAM, a citizen of the United States, residing at Malden, in the county of Middlesex and State of Massachusetts, have invented certain Improvements in Fire-Escapes, of which the following is a full, clear, and exact description, reference being had to the accompanying drawings, making part of this specification, in which—

Figure 1 is a longitudinal section of a fire-escape having my improvement applied to the interior thereof. Fig. 2 is a perspective view of a similar fire-escape having a portion of my improvement applied to the outside thereof.

The object of my invention is to provide the means of saving life and property in case of a conflagration, and it is constructed as follows: I have a tube or chute, W, made of canvas or other suitable fibrous material in whole or in part. The canvas of which it is made is to be saturated in whole or in part with any proper chemical solution—such as Glauber's salt, alum, &c.—which has a tendency to make the canvas fire-proof. Pulverized alum, gypsum, Glauber's salt, &c., which contain in themselves the "waters of crystallization," may, if desired, be quilted in upon the canvas of the tube or chute W, or otherwise attached to the same, in order that when the chute is exposed to the heat of a conflagration, the Glauber's salt, alum, &c., shall melt and give out the waters of crystallization which they contain for the protection of said chute from the heat and flame. The chute W may also be covered to a greater or less extent with a composition of asbestus, or a composition of which asbestus forms a principal part, or other similar fire-proof composition. An outer case or covering of asbestus cloth or other fire-proof material may also be employed, which covering enwraps such portions of the chute W which may be most exposed to the heat and flame of a conflagration. Masses of sponge, shoddy, or cotton may be quilted in or otherwise attached to the chute W. These articles will absorb and give out water, and thus defend the chute from injury during a conflagration. But to secure the tube or chute W completely from all injury by the heat and flame of a conflagration, I employ the following means of instantly wetting and saturating said chute W with water and keeping it wet and saturated during the time of the longest conflagration.

It is a well understood fact that a wet cloth cannot be burned, and this fact constitutes the philosophic basis of my invention. To accomplish this object—viz., the complete wetting and saturating with water or other fire-quenching material of the canvas tube or chute W, and keeping it thus wet and saturated for an indefinite length of time—I employ a pipe or hose, Y, with perforations, orifices, or nozzles $k\,k$ on its sides, and I place inside or outside, but preferably on the inside, of the tube or chute W, and passing from the lower end of the same to the top thereof, and thence back into the chute, or in any desired direction, one or more of the above-described flexible pipes or hose Y Y. These pipes or hose Y Y have at proper points branches $g\,g$, and these branches $g\,g$ and suitable portions of the main pipe or hose Y are perforated or have orifices or nozzles $k\,k$ at proper intervals. I also provide water-receptacles $c$, made of cloth, metal, or other suitable material, and arranged with perforations, orifices, or nozzles $k\,k$, for sprinkling and distributing the water, said receptacles $c$ being located at suitable points in or upon or contiguous to the chute W to receive water and distribute the same instantly to every portion of the chute W for the purpose of thoroughly wetting it simultaneously in every part.

Instead of the flexible pipes Y Y above described being used for conducting water into or upon the chute W, conductors or water-passages equivalent to the flexible pipes or hose Y Y can be made out of the cloth of the chute itself by properly folding over and sewing up a portion of the same, and providing the water-passages thus formed with branches $g\,g$ and perforations, orifices, or nozzles $k\,k$.

To the upper end of the chute W, I fasten firmly a bar of wood, L. This bar L is long enough to pass across a window on the inside and extend some distance beyond each side of the same. The bar L is provided with sharp-pointed set-screws $p\,p$. When the chute W is placed in position for use, the bar L is placed transversely across the window, and the screws $p\,p$ are turned into the frame of the same, and the chute will thus be securely held in its place. After the upper end of the chute W is thus fastened to the window-frame or other suitable place the lower end of the chute is let down to the ground.

The above mode of fastening the chute W to the window-frame may be used, or any suitable arrangement of rings or hooks or other fastening device may be used instead. As soon as this is done, the firemen in the street below attach a hose from the fire-engine or hydrant to the lower end of the pipe Y, and the power of the engine or hydrant will force the water up the pipe Y and through all its branches $g\ g$ to the top of the tube or chute W in the same way in which the fire-engine or hydrant will send water to the highest roofs through "stand-pipes," and the water sent up through the pipes Y Y will flow from the perforations, orifices, or nozzles $k\ k$ in every direction, and will in a few seconds of time thoroughly wet and saturate the canvas fire-escape tube or chute W from top to bottom, and by occasionally sending more water up the pipes Y Y the chute W can be kept wet and saturated throughout any length of time, and will remain uninjured by heat and flame. As soon as the chute W is thus secured to the window-frame by the use of a bar, L, or by rings and hooks or other suitable fastenings, and thoroughly wet by the firemen below, as above described, the persons in peril, by placing themselves in the chute, can glide safely to the ground below. The pipes or hose Y Y can be placed outside the chute W, when desired, as seen in Fig. 2, and it is not absolutely necessary that the pipes or hose Y Y, when used on the outside, shall be actually attached to the chute W; but the pipe or hose Y Y, arranged, as described, with branches $g\ g$, all provided with perforations, orifices, nozzles, &c., $k\ k$ on their sides for the purpose of sprinkling, may be carried up alongside the chute, and, receiving water from the fire-engine or hydrant below, will sprinkle the chute at once throughout by the simultaneous discharge of the water upon the chute from all the perforations, orifices, nozzles, &c., in the side of the pipes or hose Y Y and their branches $g\ g$, in distinction from the ordinary mode of wetting chutes by the use of the common discharge-pipe of the fire-engine or hydrant, which wets the chute but imperfectly and in spots, and which discharge-pipe must be carried by the fireman from point to point in order to wet the chute at all, and while he is engaged in wetting one portion the parts already wet will quickly be dried by the contiguity of heat and flame and the dried portions will at once be scorched and burned, thus rendering the chute useless as a means of escape.

By the use of my invention—viz., the pipes or hose Y Y, made and operated as described—the entire chute is instantly wet and drenched in every part with water, and the chute can easily be kept in that condition for any length of time, thus enabling large numbers of people who may be in peril in buildings on fire to escape safely from the danger by keeping the means of escape available for an indefinite period of time.

To save the persons who may descend through the chute W from any annoyance from the jets of water coming through the perforations, orifices, or nozzles $k\ k$ in the pipes or hose Y Y and their branches $g\ g$, I place a shield of cloth, J, over the pipes Y Y and their branches $g\ g$, and the jets of water from the perforations, orifices, or nozzles $k\ k$ being forced through the interstices of the cloth which constitutes the shields J J will come out in the form of spray. These shields J J may be made as wide as needed, in order that they may assist in diffusing the water throughout the chute W evenly. If desirable, the shields J J may be made of water-proof material, and in that case may become a water-proof lining to the chute W, so that persons descending the chute can avoid being wet at all.

In order to prevent the chute W from collapsing in any degree, I place, if desirable, at suitable intervals, rings or hoops S, made, preferably, of light tough wood, and to these rings or hoops S the canvas of the chute W is properly fastened.

Suitable pendants of rope, canvas, or leather may be placed at proper intervals, which the persons descending the chute can take hold of, in order to control or retard their descent.

In order to ventilate the chute W, I have spaces or orifices $t$ at suitable points, and these spaces are covered with wire-gauze or other suitable material.

It being in case of a conflagration very desirable that the fire department in the street below should have the means of communicating with the people in peril in the upper rooms of buildings on fire, I employ the following device: At proper intervals I place on the outside of the chute W suitable rings, $o$. I then arrange an endless band of cord, leather, or chain, $v$, to pass through the rings $o\ o$. To this endless band $v$ I attach small pieces of parchment $i$, or other suitable material. On these pieces of parchment, &c., the firemen write words of encouragement or direction to the persons in peril, or to any members of the fire department who may be aloft. By operating the band $v$ the parchment $i$ containing the message is carried aloft to the people in peril in the upper rooms.

In order to facilitate the work of rescuing the persons in peril, I combine with the above-described chute W a flexible ladder, F, provided with rounds $a\ a$, of wood or other material, the flexible ladder F being placed inside the chute W and fastened to the upper end of the same.

In case of a conflagration it is of the utmost importance to send some of the firemen aloft to the upper rooms of the building on fire for the purpose of taking charge of the terrified persons there and superintending their descent through the chute W to the ground. I therefore propose to have the chute W placed at first in a vertical position, so that the necessary number of firemen can ascend the flexible ladder F, which is inside the chute W. After the firemen have ascended they can draw up the flexible ladder F, and then the firemen below can draw out the lower end of the chute to a proper angle, and then the persons in peril are sent safely down through the chute W to the ground below.

Instead of having the flexible ladder F, the rounds a a may be directly attached to the inside of the chute W. The chute W is to be made in sections, so that it can be adapted to buildings of various heights. The sections are to be fastened together by any suitable means.

In order to elevate the chute W and place it in position, I have a platform or truck on wheels. On this platform I arrange an extension mast or pole. Each section of this mast or pole slides into the section next below it, like a telescope, or it may slide upon the face or surface or in grooves of the section next below. To the top of the upper mast or pole I fasten the top of the chute W. This arrangement of extension masts or poles is fixed at the base to a rocker or axle, and the rocker or axle is suitably fastened to the platform. The lower part of the chute W, when used in connection or combination with the platform and extension-masts, is enlarged so as to form a sort of tent, and while the chute W, including, of course, the enlarged portion, is kept drenched with water, the firemen place themselves under the lower or tent portion of the chute and hoist the masts by the use of any suitable machinery. Of course, as the masts are hoisted the upper end of the chute will be elevated. When high enough, the extended mast, by operating the rocker or axle at its base, can be easily swung in toward the building on fire, and the chute W is thus placed in position, and the firemen can then ascend the flexible ladder F, which is inside the chute W, and thus obtain ready access to the upper rooms of the building on fire, and safely and effectively operate to subdue the flames. The chute W having been made fast to the window-frame of the upper story, the masts can be lowered and with the truck taken away, and the chute be used for the escape of the people in peril.

In order that the quantity of water used to wet the chute W and its direction in or upon the chute may be under the perfect control of the fireman in charge, I have a faucet or stop-cock arranged for each flexible pipe Y. By opening the faucets each pipe Y is fully supplied with water, and by closing them the water-supply is cut off. These faucets are so arranged that the act of closing any one of them to stop the supply of water will at the same time open a relief-passage, through which all the water remaining in the flexible pipe Y, to which such faucet belongs, will instantly run to the ground, thus removing entirely all pressure upon the flxible pipe Y in the chute W.

Having fully described my invention, what I desire to claim and secure by Letters Patent is—

1. The canvas fire-escape tube or chute W, provided with one or more flexible pipes or water-conductors, Y, having branches $g\ g$, provided with perforations, orifices, or nozzles $k\ k$, for the purpose of conveying water from a fire-engine or hydrant to all portions of said tube or chute W, and instantly wetting every part of the same, substantially in the manner shown and described.

2. The combination, with the chute W and its pipes or water-conductors Y, of the shields or lining J, placed over the pipes Y, substantially as and for the purpose described.

3. The flexible ladder F, in combination with the fire-escape chute W, substantially as and for the purpose described.

4. The chute W, provided with ventilating-spaces $t$, substantially as and for the purpose described.

5. The combination, with the chute W, of the rings $o\ o$, the endless band $v$, and parchment $i$, attached thereto, substantially as and for the purpose described.

6. The combination of the pipes or hose Y Y, provided with branches $g\ g$, and water-receptacles $c$, having perforations, orifices, or nozzles $k\ k$, with the fire-escape tube or chute W, all constructed and arranged to operate substantially in the manner and for the purpose set forth.

GEORGE W. PUTNAM.

Witnesses:
W. J. CAMBRIDGE,
W. VEAZIE.